UNITED STATES PATENT OFFICE.

BOTHO SCHWERIN, OF FRANKFORT-ON-THE-MAIN, GERMANY.

METHOD OF SEPARATING SUBSTANCES IN SUSPENSION BY WASHING.

14,583. Specification of Reissued Letters Patent. Reissued Jan. 7, 1919.

No Drawing. Original No. 1,029,579, dated June 11, 1912, Serial No. 646,746, filed August 29, 1911. Application for reissue filed February 11, 1913. Serial No. 747,812.

*To all whom it may concern:*

Be it known that I, BOTHO SCHWERIN, a subject of the Emperor of Germany, and a resident of Frankfort-on-the-Main, Germany, have invented certain new and useful Improvements in Methods of Separating Substances in Suspension by Washing, of which the following is a specification.

The present invention relates to an improved method of treating a composite mass or body held in suspension in a liquid so that the component parts thereof may be separated one from another.

As experiments in the subject of colloidal chemistry have shown, a large number of substances in colloidal condition can be brought into finely divided condition in suspension in water or in other liquids. Practical experience in the treatment of such material suspended in water has shown that such material acts as though it were charged with electricity, the charge, in some instances or with certain substances, appearing to be negative and in others positive as compared with the water.

It is now known that sedimentation of the whole mass suspended in the liquid can be obtained and the liquid may thus be clarified by the use of the following methods.

By one of these methods the material may be coagulated and sedimented by being mechanically adsorbed or held by some precipitate which is produced in the liquid containing the suspended matter, such as might be done, for example, by producing a calcium carbonate precipitate in water in which silica was suspended. The other method causes sedimentation or coagulation of the whole slime by neutralization of the electrical charges, which neutralization of charge can be brought about in several ways. For instance, sedimentation of a suspended matter of electronegative character may be effected by adding to the suspension a suspension of an electropositive body. It is also well known, that coagulation and sedimentation of the whole suspended matter may be obtained by adding to the suspension a suitable electrolyte, which will contain positive ions of salts if the matter in suspension is of an electronegative nature and negative ions if, on the other hand, the suspension is of an electropositive character. As a precipitating agent lime is also most extensively used where the precipitating effect is required for sedimentation of a suspended matter and clarification of the liquid. It has been found that if milk of lime is introduced into the tailings launder it neutralizes the free acid and precipitates the dissolved metallic salts as flocculent hydroxids. These flocculæ catch up the small particles of alumina and silica, and carry them down, leaving the water clear.

By using these methods it is intended in every case to effect coagulation and sedimentation of the whole suspended matter and clarification of the liquid containing the suspended matter. The purpose and effect of the method hereinafter described is, however, clearly distinguishable from that referred to.

There are many substances which are of a composite character and in which the connection between the particles of different nature is so close that it is difficult or impossible to effect a separation of the single components building up the substance in question. It has been demonstrated that according to the prevailing conditions, certain parts of the material suspended in a liquid can be deposited more or less quickly while another part of the material remains in suspension and cannot be precipitated, or only so after a very long time. Those particles, which, under favorable conditions are first of all precipitated are called "gels" while those particles remaining in suspension are called "sols." Now it is known that a complete separation into "sols" and "gels" of substances of different weight or of bodies differently charged, or particles of the same substance in different degree of fineness, is very difficult or even impossible, since on the one hand the particles precipitating in gel-condition carry others being in sol-condition with them to the bottom, while on the other hand the larger and coarser are surrounded to a certain extent by particles remaining in suspension and prevented from settling.

The object of the present invention is a method which enables both the gels and the sols to be obtained quickly and cheaply from a slime and to separate these two classes from a slime, easily and with certainty by a perfect decomposition of the coagulated or composite substance in suspension, separating both the gels and the sols and precipitating totally and quickly the gels and retaining on the other hand in suspension the constituents which shall remain in sol-condition.

The process is therefore especially suitable for the commercial purification and separation of mixtures of finely divided bodies in suspension or in colloidal form. To mention an example, by the present method clay and kaolin having impurities such as sand, iron pyrites and the like, can be commercially purified. Furthermore the method may be utilized for separating finely divided ores, such as iron ore from raw material, which hitherto could not be done the iron ore being lost.

According to the present invention, I add to the liquid holding the composite mass in suspension an electrolyte of such electrical character that a portion of the suspended matter will remain suspended in "sol-condition". The other portions of the composite matter, however, are deposited.

The portion of the suspended matter which will remain suspended is determined by the effective ions of the electrolyte added. Thus, on the addition of a basic or so called "electropositive" electrolyte, such as caustic soda, the effective ions are the negatively charged hydroxyl ions and they will cause increased dispersion and continued suspension of electronegatively charged particles and coagulation of electropositively charged particles.

For example, if the substance in suspension is a mixture of an electro-negative clay and an indifferent or electropositive body, as for instance iron ore, the addition of an electrolyte of electropositive or basic nature, for instance hydroxid of sodium, will convert the clay into such a condition that the particles thereof will be retained in suspension in "sol-condition". Under the microscope intense Brownian movements of such particles can be observed. The particles of the oppositely charged iron ore, however, will not be agitated but rapidly separated from the clay and deposited. Or again, if the substance be a mixture of fine particles of clay and sand the addition of a solution of ammonia will effect a rapid separation of the sand from the clay, causing the sand to be precipitated while retaining the fine particles of clay in suspension.

The substance separated from the suspension by the method described can be withdrawn from the liquid and the matter remaining in suspension subsequently recovered and treated if desired.

The amount of electrolyte required for the above described process is extremely small. For instance 10 kg. of a substance consisting of a mixture of clay, sand, etc., suspended in 20 liters of water only requires five cubic-centimeters of a 25%-solution of ammonia. This extremely small quantity of ammonia is sufficient for separating the sand from the fine clay.

Finely divided substances are sometimes more or less indifferently affected by the action of electrolytes and the addition of such electrolyte alone is not sufficient to effect the result hereinbefore described. I have found that such substances may be made electrically active by causing them to adsorb colloidal substances of a strong electropositive or electronegative character. As examples of substances of this character, hereinafter referred to as non-neutral colloidal bodies, may be noted humic acid, silicic acid, aluminum hydroxid, etc. By the aid of such a non-neutral body the action of the proper electrolyte upon the otherwise indifferent substance will be as described when referring to substances which are naturally either strongly electropositive or electro-negative in character.

For example a suspension of indifferent clay is mixed with a small quantity of humic acid. After a short time an electrolyte containing hydroxyl-ions, such as for instance caustic soda in solution, is added in small quantities. The suspension passes gradually over into the sol-state, and the foreign particles, which are not in the sol-state, are precipitated.

The same effect may be obtained, if soluble colloidal silicic acid is added to a suspension of indifferent clay, and thereafter adding caustic soda in solution.

One can also proceed in the opposite manner by adding firstly caustic soda in solution and thereafter the soluble colloidal silicic acid. The same effect may be also obtained if the colloidal silicic acid is added in the form of waterglass-solution to the suspension of an indifferent substance. Waterglass in solution is strongly hydrolyzed and contains hydroxyl ions and silicic acid. The silicic acid is absorbed by the mass which is in suspension, while the alkali having the property of a suitable electrolyte soon causes the sol-state. The quantity of electrolyte added is also extremely small.

For instance with the aforesaid example it is sufficient to add to 1000 parts of clay, suspended in water, about one part of soluble colloidal silicic acid and about one part of caustic soda in order to attain the purification of clay.

I am aware that heretofore acids and alkalis have been added to substances for various purposes but believe myself to be the first to have employed an electrolyte for the purpose of separating substances, or to have discovered that composite substances may be separated in the manner described.

It has been proposed to add an acid as, for instance, acetic acid to solutions of kaolin in order to precipitate the solids;

salts or alkalis or lime have been added to peat to improve the quality thereof and soda has been added to faience, porcelain or chamotte in order to bring the material into proper condition for molding. It has also been recognized that finely divided substances are made more adaptable for suspension by adding thereto suitable electrolytes and that such electrolytes have been added to substances held in suspension to coagulate and precipitate such substances wholly, for the purpose of clearing the water or recovering the suspended matter, or both. It will be observed, however, that the method hereinafter claimed does not involve the coagulation of suspended matter for the purpose of precipitating it but rather on the contrary a dissolution of coagulation, disintegration or breaking up of a composite or coagulated substance into its component parts and causing one of said parts to be retained in suspension, while another separates therefrom and precipitates.

The method claimed is also clearly distinguished from those heretofore proposed for separating substances held in solution by what may be termed a "suspension" process. In such a process use is made of a layer of suitable material, such as a soap solution, fat, oil, etc., which is relatively lighter than the body of water to which it is applied so that it will float thereon, and this floating body suspends and retains the finer particles while the others pass therethrough. By such "suspension" process the character of the floating layer or separating body does not depend upon the electrolytic nature of the material treated, as in the present invention, but may be of the same character, for example a soap solution, whether the component of the material treated that is to be retained in suspension is of electro-negative or electro-positive nature. Examples of this are found in the patents to Ivery, 667,222, where a soap is used to retain an electro-negative clay in suspension, and in the patents to Cartwright, 980,143 and 988,692, where soap is used for the same purpose with electro-positive metal oxid.

What I claim is:

1. The herein described method of separating a composite mass containing oppositely charged particles suspended in a liquid which consists in adding to the liquid an electrolyte containing ions of an electrical character which is the same as the character of the part of the composite mass which it is desired shall remain in suspension in sol-condition and permitting the part thereof having opposite electrical character to deposit.

2. The herein described method of separating a composite mass suspended in a liquid which consists in adding to the liquid a strongly non-neutral colloidal body and an electrolyte containing ions of an electrical character which is the same as the character of the part of the resulting composite mass which it is desired shall remain in suspension in sol-condition and permitting the part thereof having opposite electrical character to deposit.

3. The process of separating the ingredients of a mixture which consists in suspending said mixture in a suitable liquid medium, the ingredients of said mixture thereby acquiring unlike electrical charges, and adding to the suspension an electrolyte yielding ions adapted to neutralize or weaken the charges on particles of one sign and not those of the other sign and thereafter separating the former particles, which are deposited from the latter, which remain suspended.

4. The process of purifying impure clay which consists in suspending in water the clay containing impurities having an opposite electrical sign when thus suspended, and adding thereto an alkaline electrolyte adapted to neutralize the charges on the impurities to cause the clay to be retained in suspension and the impurities deposited.

5. The process of purifying impure clay which consists in suspending in water the clay containing impurities having an opposite electrical sign when suspended, adding thereto a minute amount of dissolved sodium hydroxid, and permitting the suspension to remain at rest, whereby the clay particles are retained in suspension and the impurities deposited.

In testimony whereof I affix my signature in presence of two witnesses.

BOTHO SCHWERIN.

Witnesses:
JEAN GRUND,
CARL GRUND.